US012640308B2

(12) United States Patent
Zenzai

(10) Patent No.: US 12,640,308 B2
(45) Date of Patent: May 26, 2026

(54) MULTILAYER CERAMIC CAPACITOR AND BUMP-PRODUCING PASTE

(71) Applicant: Murata Manufacturing Co., Ltd., Nagaokakyo (JP)

(72) Inventor: Kota Zenzai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 101 days.

(21) Appl. No.: 18/629,015

(22) Filed: Apr. 8, 2024

(65) Prior Publication Data

US 2024/0258029 A1     Aug. 1, 2024

Related U.S. Application Data

(63) Continuation of application No. PCT/JP2022/041549, filed on Nov. 8, 2022.

(30) Foreign Application Priority Data

Nov. 10, 2021     (JP) ................................. 2021-183733

(51) Int. Cl.
$H01G\ 2/02$          (2006.01)
$H01G\ 4/232$         (2006.01)
(Continued)

(52) U.S. Cl.
CPC .............. $H01G\ 2/02$ (2013.01); $H01G\ 4/2325$ (2013.01); $H01G\ 4/248$ (2013.01); $H01G\ 4/30$ (2013.01)

(58) Field of Classification Search
CPC .......... H01G 4/30; H01G 4/248; H01G 4/228; H01G 4/2325; H01G 2/02; H01G 4/232
(Continued)

(56) References Cited

U.S. PATENT DOCUMENTS 8,743,528 B2 * 6/2014 Satou ....................... H01G 4/30
361/321.1
10,566,137 B2   2/2020 Park et al.
(Continued)

FOREIGN PATENT DOCUMENTS

JP          2003272957 A      9/2003
JP          2010226017 A     10/2010
(Continued)

OTHER PUBLICATIONS

International Search Report in PCT/JP2022/041549, mailed Feb. 14, 2023, 3 pages.
(Continued)

*Primary Examiner* — Arun Ramaswamy
(74) *Attorney, Agent, or Firm* — Keating & Bennett, LLP

(57) ABSTRACT

A multilayer ceramic capacitor includes a multilayer body including dielectric layers and internal electrode layers alternately laminated on one another, outer electrode layers on end surfaces of the multilayer body at opposite ends in a longitudinal direction and covering end surface sides of principal surfaces of the multilayer body at opposite ends in a laminating direction and end surface sides of side surfaces at opposite ends with respect to a width direction, and bumps on the end surface sides of one of the principal surfaces of the multilayer body such that the outer electrode layers covering the one principal surface are sandwiched between the bumps and the one principal surface. Each of the bumps includes tin regions, metal regions including copper, and silver regions including silver.

20 Claims, 8 Drawing Sheets

(51) Int. Cl.
 *H01G 4/248* (2006.01)
 *H01G 4/30* (2006.01)

(58) Field of Classification Search
 USPC ..................... 361/301.4, 306.3, 321.1, 321.3
 See application file for complete search history.

(56) References Cited

U.S. PATENT DOCUMENTS

| | | | | |
|---|---|---|---|---|
| 10,658,118 | B2 * | 5/2020 | Park | H01G 4/30 |
| 12,009,155 | B2 * | 6/2024 | Yokomizo | H01G 4/40 |
| 2015/0206661 | A1 * | 7/2015 | Fujimura | H01G 4/012 |
| | | | | 361/301.4 |
| 2019/0080845 | A1 | 3/2019 | Onodera et al. | |
| 2019/0287719 | A1 * | 9/2019 | Fujita | H01G 4/232 |
| 2020/0343048 | A1 | 10/2020 | Yokomizo | |
| 2021/0035742 | A1 * | 2/2021 | Hattori | H01G 4/30 |

FOREIGN PATENT DOCUMENTS

| | | | | | |
|---|---|---|---|---|---|
| JP | 2015216337 | A | | 12/2015 | |
| JP | 2018190952 | A | * | 11/2018 | .......... H05K 3/3442 |
| JP | 2019050278 | A | | 3/2019 | |
| JP | 2020181962 | A | | 11/2020 | |
| JP | 2021027054 | A | | 2/2021 | |
| KR | 20150127965 | A | | 11/2015 | |
| KR | 20200125456 | A | | 11/2020 | |
| WO | 2018101405 | A1 | | 6/2018 | |

OTHER PUBLICATIONS

Written Opinion in PCT/JP2022/041549, mailed Feb. 14, 2023, 3 pages.
Zenzai et al., "Multilayer Ceramic Capacitor and Paste for Producing Bump", U.S. Appl. No. 18/637,603, filed Apr. 17, 2024.

* cited by examiner

MULTILAYER CERAMIC CAPACITOR AND BUMP-PRODUCING PASTE

CROSS REFERENCE TO RELATED APPLICATIONS

This application claims the benefit of priority to Japanese Patent Application No. 2021-183733 filed on Nov. 10, 2021 and is a Continuation Application of PCT Application No. PCT/JP2022/041549 filed on Nov. 8, 2022. The entire contents of each application are hereby incorporated herein by reference.

BACKGROUND OF THE INVENTION

1. Field of the Invention

The present invention relates to multilayer ceramic capacitors and bump-producing pastes.

2. Description of the Related Art

A multilayer ceramic capacitor includes an inner layer portion including dielectric layers and internal electrodes alternately laminated on one another. Dielectric layers serving as outer layer portions are disposed on upper and lower portions of the inner layer portion, and a rectangular parallelepiped multilayer body is thereby formed. Outer electrodes are provided on longitudinally opposite end surfaces of the multilayer body, and a capacitor main body is thereby formed.

One known multilayer ceramic capacitor proposed to reduce the occurrence of so-called "acoustic noise" includes bumps that are formed on a mounting side of a capacitor main body to be mounted on a substrate so as to cover a portion of outer electrodes (see Japanese Unexamined Patent Application Publication No. 2015-216337).

SUMMARY OF THE INVENTION

However, in the conventional product, the adhesive strength between the capacitor main body and the bumps is low, and the bumps are separated from the capacitor main body in some cases.

Example embodiments of the present invention provide multilayer ceramic capacitors and bump-producing pastes that improve an adhesive strength between a capacitor main body and bumps.

A multilayer ceramic capacitor according to an example embodiment of the present invention includes a multilayer body including dielectric layers and internal electrode layers alternately laminated on one another, outer electrode layers on respective two end surfaces of the multilayer body, the two end surfaces being at opposite ends with respect to a longitudinal direction intersecting a laminating direction, the outer electrode layers covering respective two end surface sides of each of two principal surfaces of the multilayer body, the two principal surfaces being at opposite ends with respect to the laminating direction, the outer electrode layers further covering respective two end surface sides of each of two side surfaces of the multilayer body, the two side surfaces being at opposite ends with respect to a width direction intersecting the laminating direction and the longitudinal direction, the outer electrode layers being connected to the internal electrode layers, and bumps located on the respective two end surface sides of one of the two principal surfaces of the multilayer body such that the outer electrode layers covering the one of the two principal surfaces are sandwiched between the respective bumps and the one of the two principal surfaces, in which each of the bumps includes tin regions, resin regions, metal regions including copper, and silver regions including silver.

A bump-producing paste according to an example embodiment of the present invention includes a metal including copper covered with silver or including copper and covered with silver, a resin including an epoxy resin, and a solvent, in which the bump-producing paste does not include a curing agent.

Example embodiments of the present invention provide multilayer ceramic capacitors and bump-producing pastes that improve an adhesive strength between a capacitor main body and bumps.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
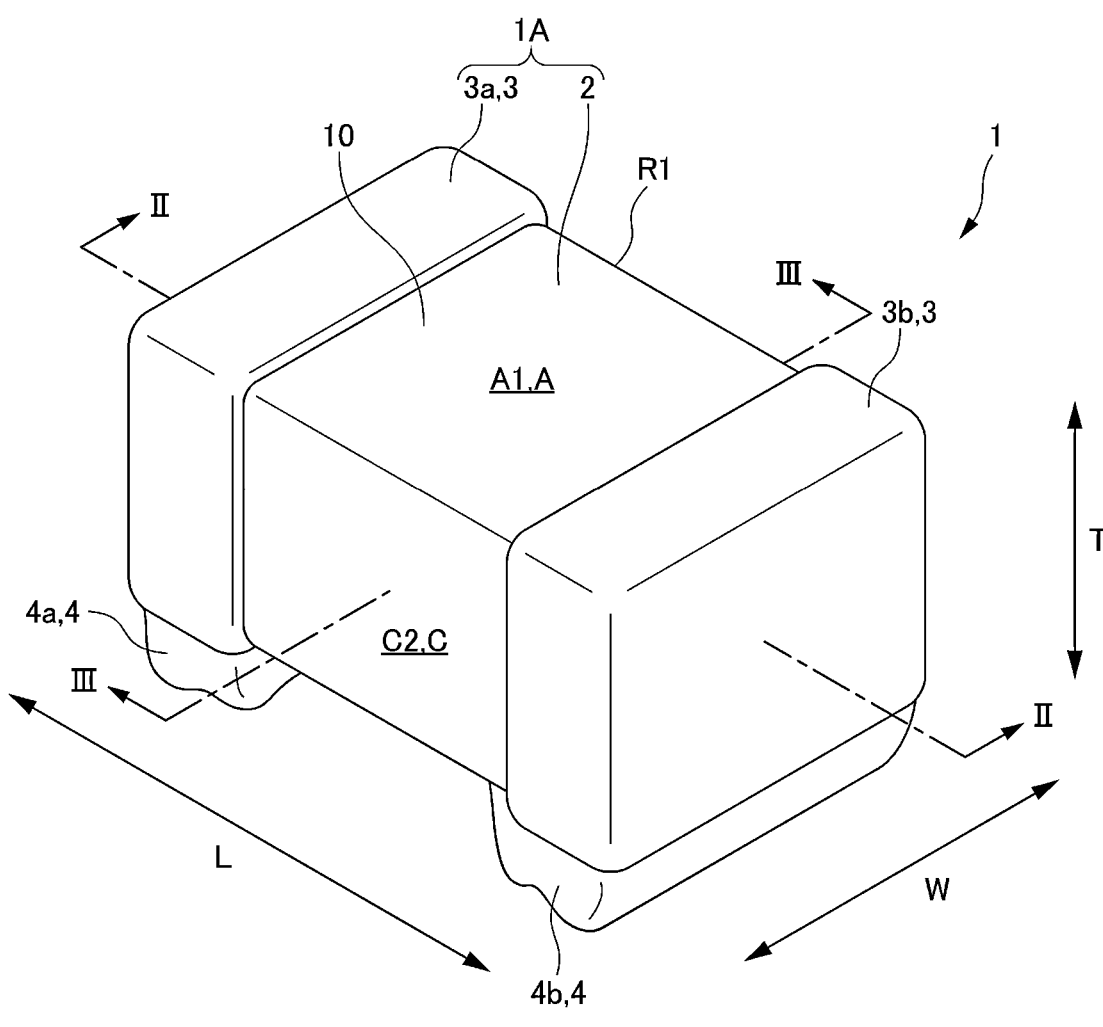
FIG. 1 is a schematic perspective view of a multilayer ceramic capacitor 1 according to an example embodiment of the present invention.
Figure 2:
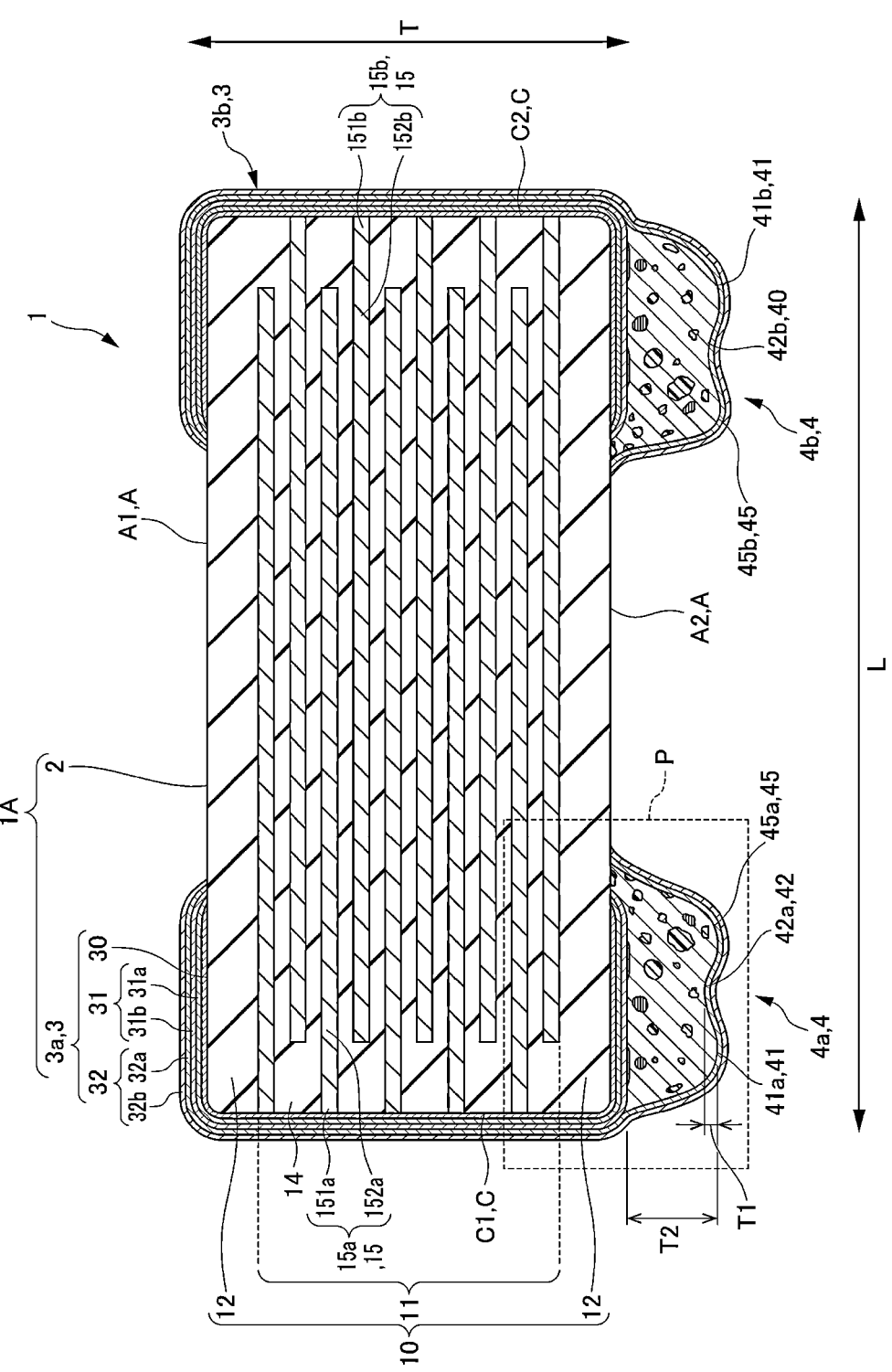
FIG. 2 is a cross-sectional view showing the multilayer ceramic capacitor 1 according to the example embodiment of the present invention of FIG. 1 and taken along line II-II in FIG. 1.
Figure 3:
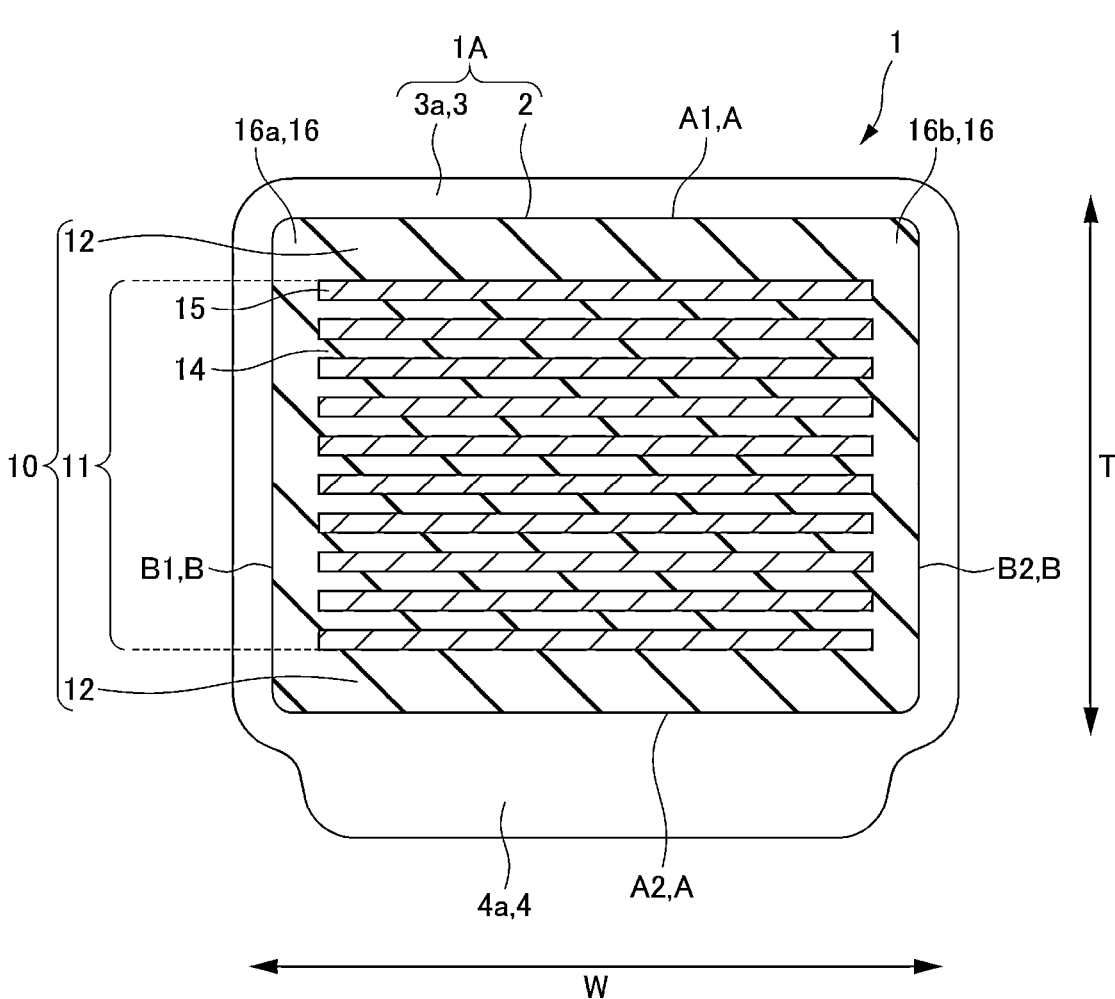
FIG. 3 is a cross-sectional view showing the multilayer ceramic capacitor 1 according to the example embodiment of the present invention of FIG. 1 and taken along line III-III in FIG. 1.

Multilayer ceramic capacitors according to example embodiments of the present invention will be described. FIG. 1 is a schematic perspective view of the multilayer ceramic capacitor 1 in a present example embodiment. FIG. 2 is a cross-sectional view showing the multilayer ceramic capacitor 1 in the present example embodiment and taken along line II-II in FIG. 1. FIG. 3 is a cross-sectional view showing the multilayer ceramic capacitor 1 in the present example embodiment and taken along line III-III in FIG. 1.

The multilayer ceramic capacitor 1 has a substantially rectangular parallelepiped shape and includes a capacitor main body 1A including a multilayer body 2 and a pair of outer electrode layers 3 at opposite ends of the multilayer body 2, and bumps 4 attached to the capacitor main body 1A. The multilayer body 2 includes an inner layer portion 11 including a plurality of pairs of a dielectric layer 14 and an internal electrode layer 15.

In the following description, as for the terms representing the orientation of the multilayer ceramic capacitor 1, the direction in which the pair of outer electrode layers 3 are arranged in the multilayer ceramic capacitor 1 is defined as a longitudinal direction L. The direction in which the dielectric layers 14 and the internal electrode layers 15 are laminated is defined as a laminating direction T. A direction intersecting both the longitudinal direction L and the laminating direction T is defined as a width direction W. In the present example embodiment, the width direction W is orthogonal to both the longitudinal direction L and the laminating direction T.

FIG. 2 shows a cross section that passes through the center, with respect to the width direction W, of the multilayer ceramic capacitor 1 and extends in the longitudinal direction L and the laminating direction T.

Outer Surfaces of Multilayer Body 2

Among the six outer surfaces of the multilayer body 2, a pair of outer surfaces opposed to each other in the laminating direction T are defined as a first principal surface A1 and a second principal surface A2, and a pair of outer surfaces opposed to each other in the width direction W are defined as a first side surface B1 and a second side surface B2. A pair of outer surfaces opposed to each other in the longitudinal direction L are defined as a first end surface C1 and a second end surface C2. In the following description, when it is not particularly necessary to distinguish the first principal surface A1 and the second principal surface A2 from each other, they are collectively referred to as principal surfaces A. When it is not particularly necessary to distinguish the first side surface B1 and the second side surface B2 from each other, they are collectively referred to as side surfaces B. When it is not particularly necessary to distinguish the first end surface C1 and the second end surface C2 from each other, they are collectively referred to as end surfaces C.

Preferably, ridge portions R1 of the multilayer body 2 each including an edge portion are rounded. Each ridge portion R1 is a portion at which two surfaces of the multilayer body 2, i.e., a principal surface A and a side surface B, a principal surface A and an end surface C, or a side surface B and an end surface C, intersect each other.

Multilayer Body 2

The multilayer body 2 includes a multilayer main body 10 including the inner layer portion 11 and outer layer portions 12 on opposite sides of the inner layer portion 11 with respect to the laminating direction T, and side gap portions 16 disposed on opposite sides of the multilayer main body 10 with respect to the width direction W.

Inner Layer Portion 11

The inner layer portion 11 includes a plurality of pairs of a dielectric layer 14 and an internal electrode layer 15, the dielectric layers 14 and the internal electrode layers 15 being alternately laminated in the laminating direction T.

The dielectric layers 14 are produced using a ceramic material. The ceramic material used is, for example, a dielectric ceramic including $BaTiO_3$ as a main component.

The internal electrode layers 15 include a plurality of first internal electrode layers 15a and a plurality of second internal electrode layers 15b. The first internal electrode layers 15a and the second internal electrode layers 15b are arranged alternately. Each of the first internal electrode layers 15a includes a first facing portion 152a that faces second internal electrode layers 15b and a first extending portion 151a extending from the first facing portion 152a toward the first end surface C1. An end portion of the first extending portion 151a is exposed at the first end surface C1 and electrically connected to a first outer electrode layer 3a described later. Each of the second internal electrode layers 15b includes a second facing portion 152b facing first internal electrode layers 15a and a second extending portion 151b extending from the second facing portion 152b toward the second end surface C2. An end portion of the second extending portion 151b is electrically connected to a second outer electrode layer 3b described later. Electric charges are accumulated in the first facing portion 152a of each first internal electrode layer 15a and the second facing portion 152b of each second internal electrode layer 15b.

Preferably, the internal electrode layers 15 include, for example, a metal material typified by nickel (Ni), copper (Cu), silver (Ag), palladium (Pd), a silver-palladium (Ag—Pd) alloy, gold (Au), etc.

Outer Layer Portions 12

The outer layer portions 12 include the same material as the material of the dielectric layers 14 in the inner layer portion 11.

Side Gap Portions 16

The side gap portions 16 include a first side gap portion 16a on the side surface B side of the multilayer main body 10 and a second side gap portion 16b on the second side surface B2 side of the multilayer main body 10. The side gap portions 16 include the same material as the material of the dielectric layers 14.

Outer Electrode Layers 3

The outer electrode layers 3 include a first outer electrode layer 3a on the first end surface C1 and a second outer electrode layer 3b on the second end surface C2. The outer electrode layers 3 cover not only the end surfaces C but also end surface C-side portions of the principal surfaces A and end surface C-side portions of the side surfaces B.

As described above, the end portion of the first extending portion 151a of each first internal electrode layer 15a is exposed at the first end surface C1 and electrically connected to the first outer electrode layer 3a. The end portion of the second extending portion 151b of each second internal electrode layer 15b is exposed at the second end surface C2 and electrically connected to the second outer electrode layer 3b. In this case, a structure in which a plurality of capacitor elements are electrically connected in parallel is provided between the first outer electrode layer 3a and the second outer electrode layer 3b.

Each of the outer electrode layers 3 includes, for example, a base electrode layer 30, a first plating layer 31, and a second plating layer 32.

The base electrode layer 30 is formed, for example, by applying an electrically conductive paste including copper and then baking the paste. The base electrode layer 30 in the present example embodiment includes glass.

The first plating layer 31 includes a first nickel plating layer 31a on the outer circumferential surface of the base electrode layer 30 and a first tin plating layer 31b on the outer circumferential surface of the first nickel plating layer 31a. The second plating layer 32 includes a second nickel plating layer 32a on the outer circumferential surface of the first tin plating layer 31b and a second tin plating layer 32b on the outer circumferential surface of the second nickel plating layer 32a. Note that, in a portion in which a bump 4 is included, the second plating layer 32 is provided on the outer circumferential surface of the bump 4.

Bumps 4

The bumps 4 include a pair of a first bump 4a and a second bump 4b. The first bump 4a is disposed on the second principal surface A2 side, which is a substrate mount surface side, of the capacitor main body 1A and located on the end surface C1 side with respect to the longitudinal direction L, and the second bump 4b is disposed on the second principal surface A2 side and located on the end surface C2 side. As shown in FIG. 2, the first bump 4a and the second bump 4b are disposed at positions substantially line-symmetric with respect to a center line passing through the center with respect to the longitudinal direction L and extending in the width direction W and are spaced apart from each other by a prescribed distance in the longitudinal direction L.

Each of the bumps 4 is disposed outside the capacitor main body 1A such that the base electrode layer 30, the first nickel plating layer 31a, and the first tin plating layer 31b of the corresponding outer electrode layer 3 that extend to the second principal surface A2 are sandwiched between the bump 4 and the capacitor main body 1A.

Each bump 4 includes not only a portion on the base electrode layer 30, the first nickel plating layer 31a, and the first tin plating layer 31b that extend along the second principal surface A2 but also a portion in direct contact with one of the outer layer portions 12 of the multilayer body 2.

In a portion of the multilayer body 2 on which no bump 4 is disposed, the second nickel plating layer 32a and the second tin plating layer 32b are disposed on the outer circumferential surface of the first tin plating layer 31b. However, in a portion on which a bump 4 is disposed, the second nickel plating layer 32a and the second tin plating layer 32b are disposed on the outer circumferential surface of the bump 4.

In each of the bumps 4, a central portion 42 with respect to the longitudinal direction L is recessed. Specifically, in each bump 4, an end surface-side portion 41 that, in the longitudinal direction L, is close to or adjacent to an end surface C on the side on which the bump 4 is disposed protrudes outward in the laminating direction T, i.e., downward in the figure, with respect to the central portion 42 of the bump 4. In this bump 4, an end portion 45 on an opposite side in the longitudinal direction L from the end surface C on the side on which the bump 4 is disposed also protrudes outward in the laminating direction T, i.e., downward in the figure, with respect to the central portion 42.

A description will be given of the bump 4a. In the bump 4a, a central portion 42a with respect to the longitudinal direction L is recessed. In the bump 4a, an end surface-side portion 41a that, in the longitudinal direction L, is close to or adjacent to the end surface C1 on the side on which the bump 4a is disposed protrudes outward in the laminating direction T, i.e., downward in the figure, with respect to the central portion 42a of the bump 4a. In the bump 4a, an end portion 45a on an opposite side in the longitudinal direction L from the end surface C on the side on which the bump 4a is disposed also protrudes outward in the laminating direction T, i.e., downward in the figure, with respect to the central portion 42.

A description will be given of the bump 4b. In the bump 4b, a central portion 42b with respect to the longitudinal direction L is recessed. In the bump 4b, an end surface-side portion 41b that, in the longitudinal direction L, is close to or adjacent to the end surface C2 on the side on which the bump 4b is disposed protrudes outward in the laminating direction T, i.e., downward in the figure, with respect to the central portion 42b of the bump 4b. In the bump 4b, an end portion 45b on an opposite side in the longitudinal direction L from the end surface C on the side on which the bump 4b is disposed also protrudes outward in the laminating direction T, i.e., downward in the figure, with respect to the central portion 42.

In each bump 4, the difference in thickness in the laminating direction T1 (the distance in the laminating direction T) between the end surface-side portion 41 and the central portion 42 is about 5% or more and about 30% or less of the thickness T2 of the bump 4 in the end surface-side portion 41 in the laminating direction T, for example.

Figure 4:
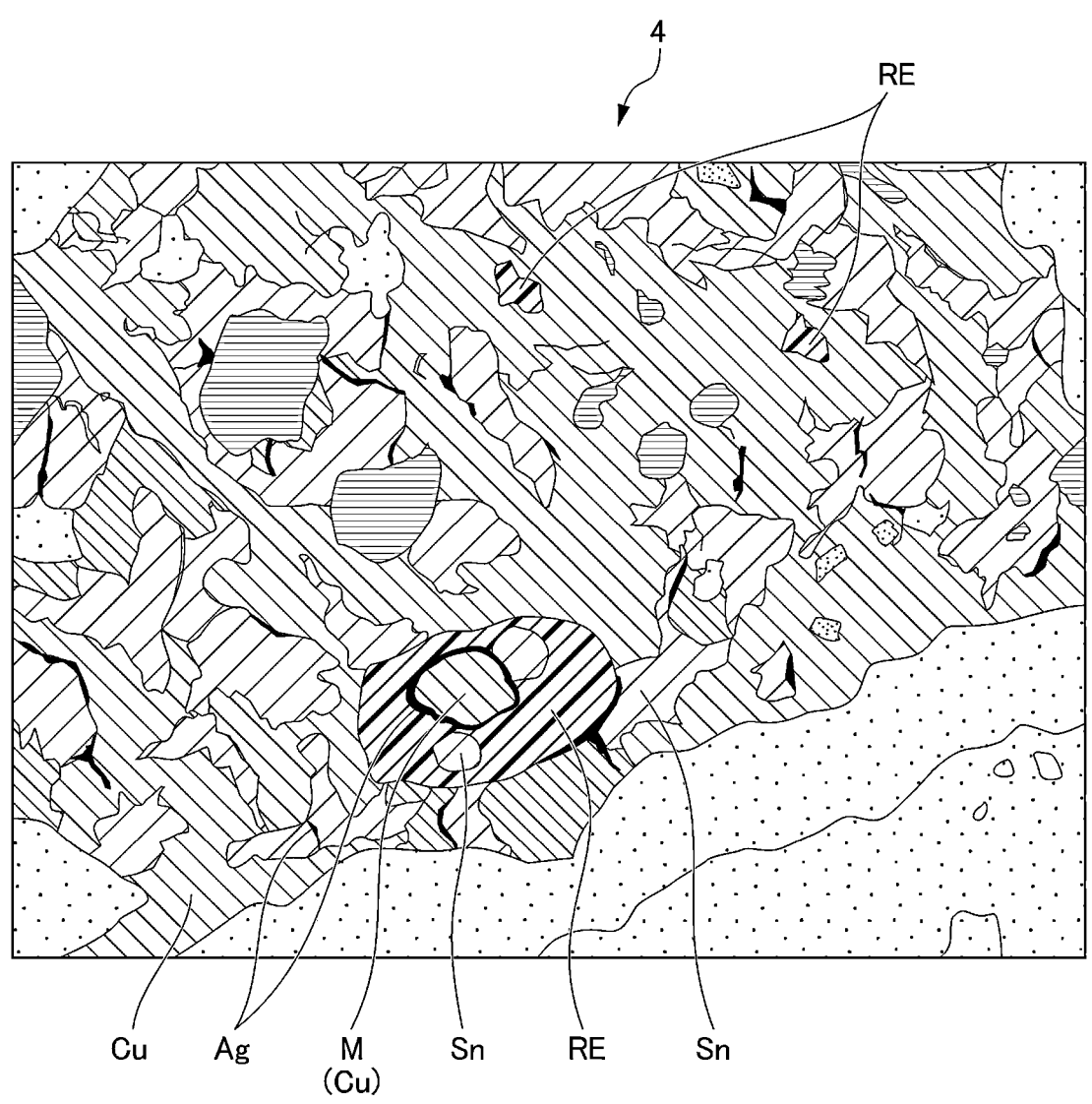
FIG. 4 is an enlarged cross-sectional view of a portion of an inner region of a bump 4.

FIG. 4 is an enlarged cross-sectional view of a portion of the inner region of a bump 4. The bump 4 includes tin Sn regions, resin regions RE, metal regions M including copper Cu or including copper Cu and nickel Ni, and silver Ag regions.

The metal regions M are represented by Cu in the figure and include copper Cu or a metal including copper Cu and nickel Ni. The metal regions M may include tin Sn. In the metal including copper Cu and nickel Ni, the copper Cu and nickel Ni may be alloyed, or tin Sn is further included to form an intermetallic compound. The silver Ag regions may include tin Sn. These regions included in the tin Sn can be detected by WDX or EDX analysis.

The resin regions RE include regions each including in an interior thereof, tin Sn or a metal region M covered with silver Ag and including copper Cu or including copper Cu and nickel Ni. When the metal region M includes copper Cu and nickel Ni, the copper Cu and nickel Ni may be alloyed, or tin Sn may be further included to define an intermetallic compound. In particular, in the resin regions RE, the composition of the included materials itself is detected.

Each of the bumps 4 further includes a reaction portion 55 present between the corresponding outer electrode layer 3 and tin Sn included in the bump 4, i.e., between a metal layer included in the outer electrode layer 3 and the tin Sn included in the bump 4. The reaction portion 55 is formed as a result of a reaction between the bump 4 and various metals included in the outer electrode layer 3. Examples of the reaction portion 55 include a reaction portion 55 formed from the tin Sn and the nickel included in the first nickel plating layer 31a, a reaction portion 55 formed from the tin Sn and the tin included in the first tin plating layer 31b, a reaction portion 55 formed from the copper Cu included in the bump 4, the nickel included in the first nickel plating layer 31a, and the tin Sn or the tin included in the first tin plating layer 31b, and a reaction portion 55 formed from a metal including Cu and Ni and the tin included in the first tin plating layer 31b or the tin Sn in the bump 4.

The resin regions RE further include resin regions RE scattered around the bump 4, circular or substantially circular resin regions RE covered with silver Ag, and resin regions RE disposed between the bump 4 and the multilayer body 2.

Method for Producing Multilayer Ceramic Capacitor 1

Figure 5:
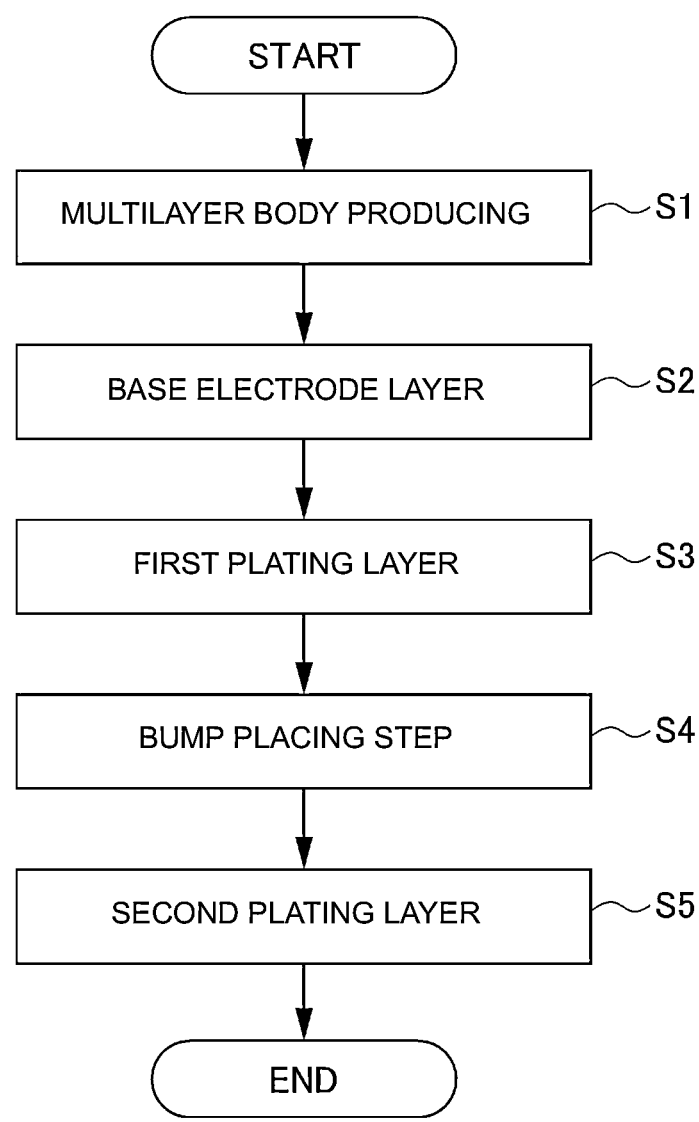
FIG. 5 is a flowchart describing a method for producing the multilayer ceramic capacitor 1.

FIG. 5 is a flowchart showing a method for producing the multilayer ceramic capacitor 1. The method for producing the multilayer ceramic capacitor 1 includes a multilayer body producing step S1, a base electrode layer forming step S2, a first plating layer forming step S3, a bump placing step S4, and a second plating layer forming step S5. FIGS. 6A to 6D are illustrations for describing the multilayer body producing step S1, the base electrode layer forming step S2, and the first plating layer forming step S3. FIGS. 7A to 7D are illustrations for describing the bump placing step S4 and the second plating layer forming step S5.

Multilayer Body Producing Step S1

A ceramic slurry including a ceramic powder, a binder, and a solvent is formed into a sheet on the outer circumferential surface of a carrier film using a die coater, a gravure coater, a micro-gravure coater, etc. Ceramic green sheets 101 for lamination that later become the dielectric layers 14 are produced in the manner described above. Next, an electrically conductive paste is applied in a strip shape to each ceramic green sheet 101 for lamination by screen printing, inkjet printing, gravure printing, etc. An electrically conductive pattern 102 that later becomes an internal electrode layer 15 is thereby formed by printing on the surface of the ceramic green sheet 101 for lamination, and a material sheet 103 with the electrically conductive pattern 102 formed thereon is produced.

Figure 6A:
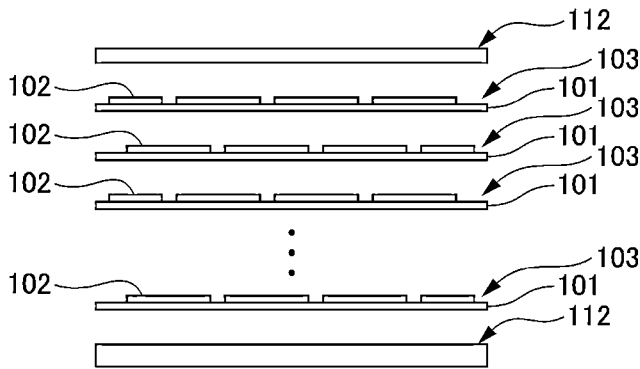
FIGS. 6A to 6D are illustrations for describing a multilayer body producing step S1, a base electrode layer forming step S2, and a first plating layer forming step S3.

Next, as shown in FIG. 6A, a plurality of the material sheets 103 are stacked such that the electrically conductive patterns 102 are oriented in the same direction and that the electrically conductive patterns 102 of adjacent material sheets 103 are mutually displaced by half a pitch in the width direction. Then ceramic green sheets 112 for outer layer portions that later become the outer layer portions 12 are stacked on opposite sides of the plurality of stacked material sheets 103.

Figure 6B:
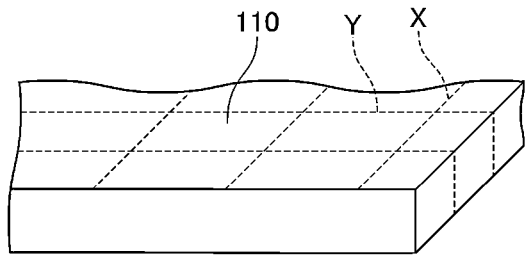

The plurality of material sheets 103 and the ceramic green sheets 112 for the outer layer portions that are stacked together are thermocompression-bonded to produce a mother block 110 shown in FIG. 6B.

Figure 6C:
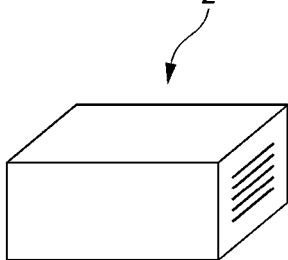

Next, the mother block 110 is cut along cutting lines X shown in FIG. 6B and cutting lines Y intersecting the cutting lines X to produce a plurality of multilayer bodies 2 shown in FIG. 6C.

Base Electrode Layer Forming Step S2

Next, an electrically conductive paste including copper is applied to the end surfaces C of each multilayer body 2 and then baked to form the base electrode layers 30. The base electrode layers 30 are formed so as to not only cover the end surfaces C on opposite sides of the multilayer body 2 but also extend to the principal surface A sides and the side surface B sides of the multilayer body 2 to thereby cover a portion of the end surface C sides of the principal surfaces A.

First Plating Layer Forming Step S3

Figure 6D:
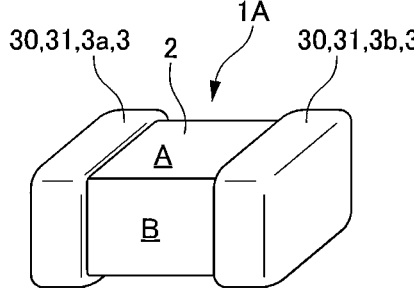

Next, the first nickel plating layer 31a and the first tin plating layer 31b disposed on the outer circumferential surface of the first nickel plating layer 31a are formed on the outer circumferential surface of the base electrode layer 30 to thereby produce the multilayer main body 10 shown in FIG. 6D.

Bump Placing Step S4

A bump-producing paste 44 used to produce bumps is prepared.

The bump-producing paste 44 includes, tin Sn, a metal including copper Cu covered with silver Ag or including, instead of the copper Cu, copper and nickel and covered with silver Ag, a resin made of an epoxy resin, and a solvent.

The epoxy resin is a bisphenol A-type epoxy resin. The solvent is, for example, diethylene glycol monobutyl ether, diethylene glycol monoethyl ether, or diethylene glycol monomethyl ether. The bump-producing paste 44 does not include a curing agent such as a phenolic resin or imidazole.

The volume ratio of the tin Sn with respect to the total volume of the metal is about 70% or more and about 90% or less, for example. The volume ratio of the metal to the resin is about 70% or more and about 90% or less, for example.

Figures 7A, 7B, 7C, 7D:
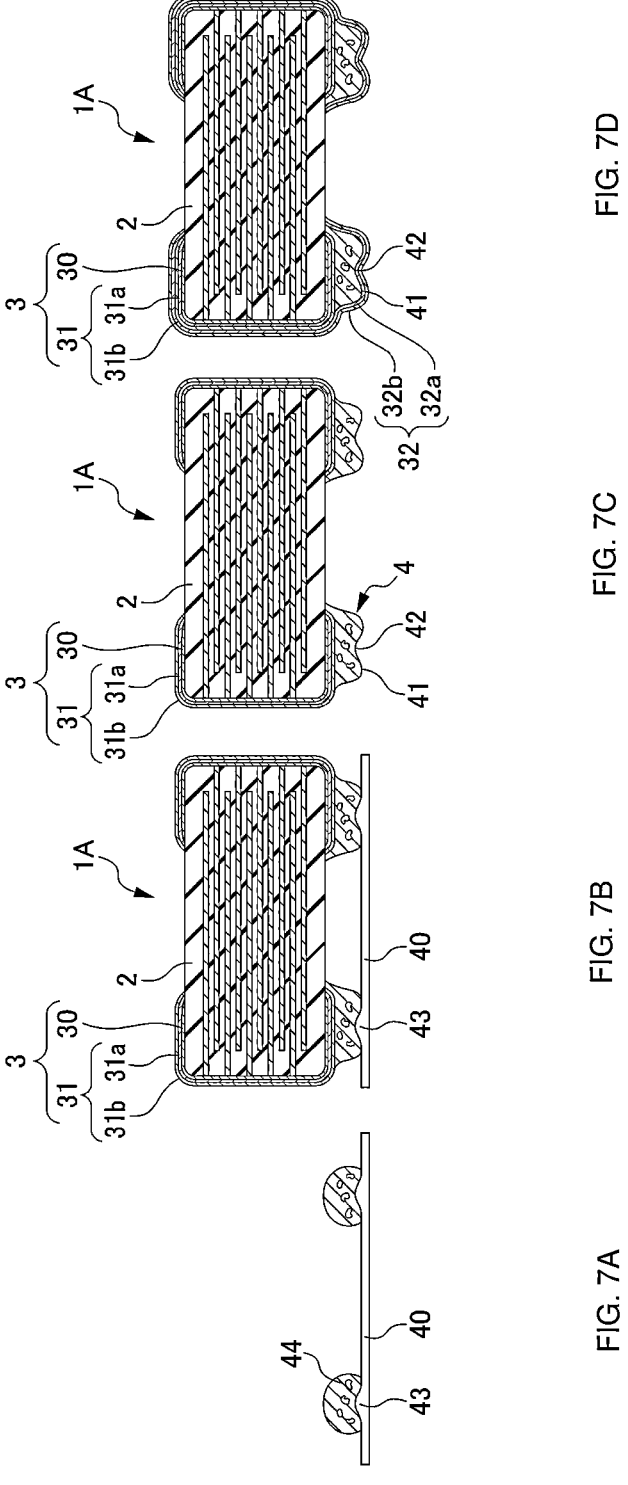
FIGS. 7A to 7D are illustrations for describing a bump placing step S4 and a second plating layer forming step S5.

To form the bumps 4, for example, a holding substrate 40 shown in FIGS. 7A to 7B is used. As shown in FIG. 7A, the holding substrate 40 in the present example embodiment includes protrusions 43 at positions corresponding to the positions of the central portions 42 within the positions on which the bump-producing paste 44 is to be placed.

The bump-producing paste 44 is formed on the holding substrate 40 using a screen printing method or a dispensing method.

Then, since the protrusions 43 have been formed as shown in FIG. 7A, the bump-producing paste 44 is shaped such that the central portion 42 with respect to the longitudinal direction L is recessed relative to the end surface-side portion 41 on the end surface C side. Specifically, the bump-producing paste 44 is shaped such that the end surface-side portion 41 on the end surface C side with respect to the longitudinal direction L protrudes outward in the laminating direction T, i.e., downward in the figure, relative to the central portion 42 that is closer to the center with respect to the longitudinal direction L than the end surface-side portion 41.

Next, as shown in FIG. 7B, the capacitor main body 1A is mounted on the outer circumferential surface of the holding substrate 40 such that the second principal surface A2 side faces the holding substrate 40. In this case, the positions of the outer electrode layers 3 of the capacitor main body 1A and the position of the bump-producing paste 44 are adjusted, and the bump-producing paste 44 adheres to the capacitor main body 1A.

With this state maintained, a heating step is performed. In this manner, at least a portion of the metal in the paste forms an intermetallic compound, and the paste is cured, so that bumps 4 joined to the capacitor main body 1A and to the outer electrode layers 3 are formed.

Then the capacitor main body 1A together with the bumps 4 is separated from the holding substrate 40, and the state in FIG. 7C is obtained.

Second Plating Layer Forming Step S5

Next, the second nickel plating layer 32a is formed on the outer circumferential surfaces of the bumps 4 and on portions of the capacitor main body 1A at which the first tin plating layer 31b is exposed, and then the second tin plating layer 32b is formed on the outer circumferential surface of the second nickel plating layer 32a. Through the steps described above, the multilayer ceramic capacitor 1 is produced.

Advantageous Effects of Current Example Embodiment

In the current example embodiment, each of the bumps 4 includes the tin Sn regions, the resin regions RE, and the metal regions including copper Cu or including copper Cu and nickel Ni. In this case, the fixing strength between the bumps 4 and the capacitor main body 1A can be increased.

The reaction portions 55 including a metal included in the outer electrode layers 3 such as nickel or tin and the tin Sn included in the bumps 4 are present between the outer electrode layers 3 and the tin Sn included in the bumps 4. The reaction portions 55 can improve the adhesive strength between the outer electrode layers 3 and the bumps 4.

The resin regions RE include those located between the bumps 4 and the multilayer body 2. The resin regions RE define and function as an adhesive to bond the bumps 4 and the multilayer body 2, so that the fixing strength between bumps 4 and the multilayer body 2 can be further improved.

The resin regions RE are produced using the epoxy resin. Therefore, the adhesive strength of the resin regions RE can be further improved.

When the multilayer ceramic capacitor is mounted on a substrate, solder is used. The solder is disposed between substrate terminals and the bumps 4. Then the solder is heated and melted in order to fix the multilayer ceramic capacitor 1 to the substrate. A portion of the molten solder flows along the end surfaces C. In some cases, the solder flowing along and wetting the end surfaces C reaches the inner layer portion 11. If this happens, vibration generated in the inner layer portion 11 of the multilayer ceramic capacitor 1 is transmitted from the solder to the substrate, and therefore the effect of preventing acoustic noise by the bumps 4 may be reduced.

However, in each of the bumps 4 in the present example embodiment, the end surface-side portion 41 that, in the longitudinal direction L, is close to or adjacent to the end surface C on the side on which the bump 4 is disposed protrudes outward in the laminating direction T relative to the central portion 42 of the bump 4.

Since the end surface-side portion 41 of each bump 4 protrudes outward in the laminating direction T as described above, the solder can be prevented from flowing up to and wetting the region of the end surface C in which the inner layer portion 11 is present. In this manner, the amount of vibration generated in the inner layer portion 11 of the multilayer ceramic capacitor 1 and transmitted from the solder to the substrate is reduced, so that the reduction in the effect of preventing the occurrence of acoustic noise by the bumps 4 can be prevented, i.e., the occurrence of acoustic noise can be reduced.

The bump-producing paste 44 in the present example embodiment includes tin Sn, a metal including copper Cu covered with silver Ag or including copper Cu and nickel Ni and covered with silver Ag, a resin made of an epoxy resin, and a solvent and does not include a curing agent such as a phenolic resin or imidazole.

Since the bump-producing paste 44 includes no curing agent, the copper Cu covered with silver Ag can react with the tin Sn or the metal including copper Cu and nickel Ni and covered with silver Ag. In this case, the strength of the bumps 4 is improved.

The volume ratio of the metal to the resin is about 70% or more and about 90% or less, for example. Therefore, sufficient electric conductivity can be obtained.

Modifications

Example embodiments of the present invention have been described above. However, the present invention is not limited to the example embodiments described above, and various modifications of example embodiments can be made within the scope of the present invention.

Figure 8:
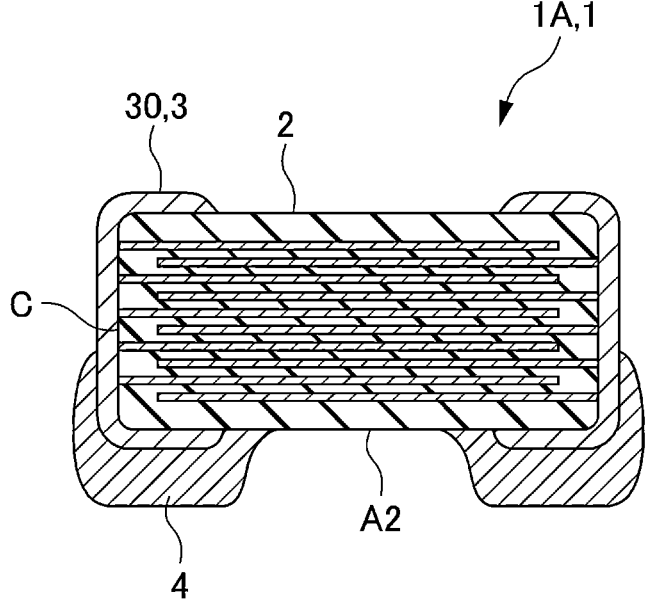
FIG. 8 is an illustration showing a modification of a multilayer ceramic capacitor 1 according to an example embodiment of the present invention.

FIG. 8 is an illustration showing a modification of the multilayer ceramic capacitor 1 according to an example embodiment of the present invention. In the description of the modifications, the same portions as those in the above example embodiments are denoted by the same symbols.

In the above example embodiments, each of the bumps 4 is in contact with only the second principal surface A2 side. However, this is not a limitation. The bumps 4 may also cover the end surface C sides as shown in FIG. 8.

In the above example embodiments, the bottom surface of each bump 4 has a shape in which the central portion 42 with respect to the longitudinal direction L is recessed and the end surface-side portion 41 close to the end surface C on the side on which the bump 4 is disposed protrudes outward in the laminating direction T, i.e., downward in the figure, with respect to the central portion 42 of the bump 4. However, this is not a limitation, and the bottom surface of each bump 4 may be flat as shown in FIG. 8.

In the example embodiments described above, each outer electrode layer 3 includes the base electrode layer 30, the first plating layer 31, and the second plating layer 32. However, this is not a limitation. It may be unnecessary to include both the first plating layer 31 and the second plating layer 32 as shown in FIG. 8, and it may be unnecessary to include one of the first plating layer 31 and the second plating layer 32.

The method for forming the shape in which the end surface-side portion 41 of each bump 4 protrudes with respect to the central portion 42 is not limited to the method described above. For example, each bump 4 can be formed by applying the bump-producing paste 44 to the upward principal surface of the multilayer ceramic capacitor 1. In this case, the bump-producing paste 44 is applied such that its amount on the end surface-side portions 41 is larger than the amount on the central portions 42, and this allows the end surface-side portions 41 of the bumps 4 to protrude outward in the laminating direction T, as in the example embodiments.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including dielectric layers and internal electrode layers alternately laminated on one another;
   outer electrode layers on respective two end surfaces of the multilayer body, the two end surfaces being at opposite ends with respect to a longitudinal direction intersecting a laminating direction, the outer electrode layers covering respective two end surface sides of each of two principal surfaces of the multilayer body, the two principal surfaces being at opposite ends with respect to the laminating direction, the outer electrode layers further covering respective two end surface sides of each of two side surfaces of the multilayer body, the two side surfaces being at opposite ends with respect to a width direction intersecting the laminating direction and the longitudinal direction, the outer electrode layers being connected to the internal electrode layers;
   bumps located on the respective two end surface sides of one of the two principal surfaces of the multilayer body such that the outer electrode layers covering the one of the two principal surfaces are sandwiched between the respective bumps and the one of the two principal surfaces; and
   at least one first resin region between the bumps and the multilayer body; wherein
   the bumps include tin regions, second resin regions, metal regions including copper, and silver regions including silver.

2. The multilayer ceramic capacitor according to claim 1, wherein the second resin regions include a resin region including at least one of tin or a metal region including copper and covered with silver.

3. The multilayer ceramic capacitor according to claim 1, wherein each of the outer electrode layers includes:
   a base electrode layer connected to the internal electrode layers and including copper;
   a first nickel plating layer on an outer circumferential surface of the base electrode layer; and
   a first tin plating layer on an outer circumferential surface of the first nickel plating layer; wherein
   a corresponding one of the bumps is on the first tin plating layer.

4. The multilayer ceramic capacitor according to claim 1, further comprising, between each of the outer electrode layers and tin included in a corresponding one of the bumps, a reaction portion including a metal included in the each of the outer electrode layers and the tin included in the corresponding one of the bumps.

5. The multilayer ceramic capacitor according to claim 1, wherein the second resin regions include resin regions scattered around the bumps.

6. The multilayer ceramic capacitor according to claim 1, wherein the second resin regions include a resin region with a circular or substantially circular shape and covered with silver.

7. The multilayer ceramic capacitor according to claim 1, wherein the at least one first resin region is between each of the bumps and the multilayer body.

8. The multilayer ceramic capacitor according to claim 1, wherein the second resin regions include epoxy resin.

9. The multilayer ceramic capacitor according to claim 1, wherein, in each of the bumps, an end surface-side portion that, in the longitudinal direction, is adjacent to a corresponding one of the two side surfaces on the side on which the each of the bumps is located protrudes outward in the laminating direction with respect to a central portion of the each of the bumps.

10. The multilayer ceramic capacitor according to claim 1, wherein each of the bumps includes a central portion that is recessed.

11. The multilayer ceramic capacitor according to claim 1, wherein in each of the bumps, a difference in thickness in the laminating direction between an end surface-side portion and a central portion is about 5% or more and about 30% or less of a thickness of the bump in the end surface-side portion in the laminating direction.

12. The multilayer ceramic capacitor according to claim 1, wherein the metal regions further include nickel or tin.

13. The multilayer ceramic capacitor according to claim 1, wherein the metal regions include nickel alloyed with the copper, and tin defining an intermetallic compound.

14. The multilayer ceramic capacitor according to claim 1, wherein the silver regions include tin.

15. The multilayer ceramic capacitor according to claim 1, wherein the second resin regions include resin regions scattered around the bumps and circular or substantially circular resin regions covered with silver; and the at least one first resin region is between each of the bumps and the multilayer body.

16. A bump-producing paste used to produce the bumps in the multilayer ceramic capacitor according to claim 1, the bump-producing paste comprising:

tin;

a metal including copper covered with silver or including copper and covered with silver;

a resin including an epoxy resin; and a solvent; wherein the bump-producing paste does not include a curing agent.

17. The bump-producing paste according to claim 16, wherein a volume ratio of the tin to a total volume of the metal is about 70% to about 90%.

18. The bump-producing paste according to claim 16, wherein a volume ratio of the metal to the resin is about 70% or more and about 90% or less.

19. The bump-producing paste according to claim 16, wherein the epoxy resin is a bisphenol A-type epoxy resin.

20. The bump-producing paste according to claim 16, wherein the solvent is diethylene glycol monobutyl ether, diethylene glycol monoethyl ether, or diethylene glycol monomethyl ether.

* * * * *